(12) United States Patent
Diener et al.

(10) Patent No.: US 7,142,108 B2
(45) Date of Patent: Nov. 28, 2006

(54) SYSTEM AND METHOD FOR MONITORING AND ENFORCING A RESTRICTED WIRELESS ZONE

(75) Inventors: Neil R. Diener, Rockville, MD (US); David S. Kloper, Mt. Airy, MD (US); D. Andrew Floam, McLean, VA (US)

(73) Assignee: Cognio, Inc., Germantown, MD (US)

(*) Notice: Subject to any disclaimer, the term of this patent is extended or adjusted under 35 U.S.C. 154(b) by 0 days.

(21) Appl. No.: 11/206,117

(22) Filed: Aug. 18, 2005

(65) Prior Publication Data

US 2006/0038677 A1 Feb. 23, 2006

Related U.S. Application Data

(60) Provisional application No. 60/602,838, filed on Aug. 19, 2004.

(51) Int. Cl.
 *G08B 1/08* (2006.01)
(52) U.S. Cl. .............................. 340/539.1; 340/568.1; 340/572.3; 340/691.6
(58) Field of Classification Search ............. 340/539.1, 340/540, 568.1, 541, 572.1, 551, 460, 572.3, 340/572.5, 517, 426.1, 5.2, 5.1, 5.61, 5.6, 340/539.22, 539.13, 691.6; 180/287
See application file for complete search history.

(56) References Cited

U.S. PATENT DOCUMENTS

| | | | |
|---|---|---|---|
| 4,054,785 A | 10/1977 | Lehmann | |
| 4,227,255 A | 10/1980 | Carrick et al. | |
| 4,501,020 A | 2/1985 | Wakeman | |
| 4,950,999 A | 8/1990 | Agnello et al. | |
| 5,005,210 A | 4/1991 | Ferrell | |
| 5,353,346 A | 10/1994 | Cox et al. | |
| 5,448,760 A * | 9/1995 | Frederick | 455/410 |
| 5,870,672 A * | 2/1999 | Stoddard et al. | 455/410 |
| 5,912,922 A | 6/1999 | Koszarsky et al. | |
| 5,956,635 A | 9/1999 | Hoogerwef et al. | |
| 5,977,913 A | 11/1999 | Christ | |
| 6,130,907 A * | 10/2000 | Chen | 370/342 |
| 6,229,997 B1 | 5/2001 | Addy | |
| 6,233,529 B1 | 5/2001 | Nonaka | |

(Continued)

OTHER PUBLICATIONS

PCT/US2005/29277 Search Report, Mar. 13, 2006.

*Primary Examiner*—Daniel Wu
*Assistant Examiner*—Daniel Previl
(74) *Attorney, Agent, or Firm*—Edell, Shapiro & Finnan, LLC (57) ABSTRACT

Monitoring for unauthorized RF energy emitted or transmitted in a particular zone or portion of a building, etc. Radio frequency energy is received in a region that encompasses a zone in which it is desired to monitor for unauthorized radio frequency energy. At least one characteristic of the received radio frequency energy is analyzed to determine whether unauthorized radio frequency energy is occurring in the zone. Unauthorized RF energy may be detected by analyzing at least one spectral characteristic of the received radio frequency energy and comparing the at least one spectral characteristic with data associated with authorized and/or unauthorized radio frequency energy. Alternatively, signal classification techniques can be applied to data derived from the received radio frequency energy to classify by type signals contained in the received radio frequency energy. Certain signal types may be designated as unauthorized in a particular restricted zone and the results of the signal classification analysis is compared with data for authorized and/or unauthorized signal types.

46 Claims, 6 Drawing Sheets

U.S. PATENT DOCUMENTS

| | | |
|---|---|---|
| 6,332,076 B1 | 12/2001 | Shah et al. |
| 6,340,928 B1 | 1/2002 | McCurdy |
| 6,484,111 B1 | 11/2002 | Nara |
| 6,493,629 B1 * | 12/2002 | Van Bosch ............... 701/207 |
| 6,584,419 B1 | 6/2003 | Alexander |
| 6,674,403 B1 | 1/2004 | Gray et al. |
| 6,697,013 B1 * | 2/2004 | McFarland et al. ......... 342/159 |
| 6,714,605 B1 * | 3/2004 | Sugar et al. ............... 375/340 |
| 6,714,606 B1 * | 3/2004 | Qian et al. ................. 375/341 |
| 6,754,488 B1 * | 6/2004 | Won et al. ................. 455/424 |
| 6,850,735 B1 | 2/2005 | Sugar et al. |
| 2003/0123420 A1 | 7/2003 | Sherlock |
| 2003/0198304 A1 | 10/2003 | Sugar et al. |
| 2003/0224741 A1 | 12/2003 | Sugar et al. |
| 2004/0028003 A1 | 2/2004 | Diener et al. |
| 2004/0028123 A1 | 2/2004 | Sugar et al. |
| 2004/0072577 A1 | 4/2004 | Petri et al. |
| 2004/0137915 A1 | 7/2004 | Diener et al. |
| 2004/0156440 A1 | 8/2004 | Sugar et al. |
| 2004/0203826 A1 | 10/2004 | Sugar et al. |
| 2004/0219885 A1 | 11/2004 | Sugar et al. |
| 2005/0030929 A1 * | 2/2005 | Swier, Jr. et al. |
| 2005/0073983 A1 | 4/2005 | Diener |
| 2005/0128989 A1 * | 6/2005 | Bhagwat et al. |
| 2005/0227625 A1 | 10/2005 | Diener |

* cited by examiner

SYSTEM AND METHOD FOR MONITORING AND ENFORCING A RESTRICTED WIRELESS ZONE

This application claims priority to U.S. Provisional Application Ser. No. 60/602,838, filed Aug. 19, 2004, the entirety of which is incorporated herein by reference.

BACKGROUND OF THE INVENTION

The explosive growth in wireless applications and devices over the past few years has produced tremendous public interest benefits. Wireless networks and devices have been deployed in millions of offices, homes, and more recently, in increasing numbers of public areas. These wireless deployments are forecast to continue at an exciting pace and offer the promise of increased convenience and productivity.

This growth, which is taking place mostly in the unlicensed bands, is not without its downsides. In the United States, the unlicensed bands established by the FCC consist of large portions of spectrum at 2.4 GHz and at 5 GHz, which are free to use. The FCC currently sets requirements for the unlicensed bands such as limits on transmit power spectral density and limits on antenna gain. It is well recognized that as unlicensed band devices become more popular and their density in a given area increases, a "tragedy of the commons" effect will often become apparent and overall wireless utility (and user satisfaction) will collapse. This phenomenon has already been observed in environments that have a high density of wireless devices.

The types of signaling protocols used by devices in the unlicensed bands are not designed to cooperate with signals of other types also operating in the bands. For example, a frequency hopping signal (e.g., a signal emitted from a device that uses the Bluetooth™ communication protocol or a signal emitted from certain cordless phones) may hop into the frequency channel of an IEEE 802.11 wireless local area network (WLAN), causing interference with operation of the WLAN. In addition, other non-communication devices or systems, such as microwave ovens, may emit energy in these unlicensed bands. Thus, technology is needed to exploit all of the benefits of the unlicensed band without degrading the level of service that users expect.

Historically, the wireless industry's general approach to solving "tragedy of the commons" problems has been for manufacturers to simply move to another commons further up the spectrum. This solution, however, is not workable for much longer, due to spectrum scarcity and to the less attractive technical characteristics of the higher bands (decreased signal propagation and the inability to penetrate surfaces).

Enterprise uses of the unlicensed band are focused on larger scale deployment of wireless networks (e.g., WLANs) and integration into wired networks. WLANs can complicate existing network management schemes because they introduce the additional requirement of efficiently managing radio spectrum. Current WLAN systems and management technology are focused on managing activity at the network level of the WLAN, but provide little or no capability to manage the frequency band where signals of multiple types (e.g., communication protocol/network types, device types, etc.) are present.

In other environments, it may be desirable to protect one type of wireless radio communication activity from other types in a zone, or in some cases, completely prohibit any wireless radio activity in a particular zone. The zone is referred to hereinafter as a restricted wireless zone. What is needed is a system and method for monitoring and enforcing unwanted wireless radio activity in a restricted wireless zone.

SUMMARY OF THE INVENTION

Briefly, a system, method and device are provided to monitor for unauthorized RF energy emitted or transmitted in a particular zone or portion of a building, etc. Radio frequency energy is received in a region that encompasses a zone in which it is desired to monitor for unauthorized radio frequency energy. At least one characteristic of the received radio frequency energy is analyzed to determine whether unauthorized radio frequency energy is occurring in the zone.

Unauthorized RF energy may be detected by analyzing at least one spectral characteristic of the received radio frequency energy and comparing the at least one spectral characteristic with data associated with authorized and/or unauthorized radio frequency energy. Alternatively, signal classification techniques can be applied to data derived from the received radio frequency energy to classify by type signals contained in the received radio frequency energy. Certain signal types may be designated as unauthorized in a particular restricted zone and the results of the signal classification analysis is compared with data for authorized and/or unauthorized signal types.

The physical position location of the source of the unauthorized RF emitter may be more precisely determined based on reception of the RF energy at one or more known positions. Steps may be taken to disable that source. In addition, a jamming signal may be transmitted in an attempt to disable the functionality of the unauthorized source.

The monitoring techniques described herein may be implemented in a stand-alone radio sensor device and/or in each of several radio sensor devices that are also connected to a central computer (server).

The above and other advantages of this technique will become more apparent when reference is made to the following description taken in conjunction with the accompanying drawings.

DETAILED DESCRIPTION OF THE DRAWINGS

The techniques for monitoring an area or region for unauthorized over-the-air radio frequency energy may be employed in a mobile radio sensor device, and/or in a system comprising multiple radio sensor devices placed at positions in the region or area of interest and supply data concerning the received RF energy that each monitors to a central server computer. A mobile radio sensor device is essentially a simplified version of the sensor devices used in the server-sensor system, but the mobile sensor device also includes user interface software to enable a user to interact with the mobile radio sensor device.

Figure 1:
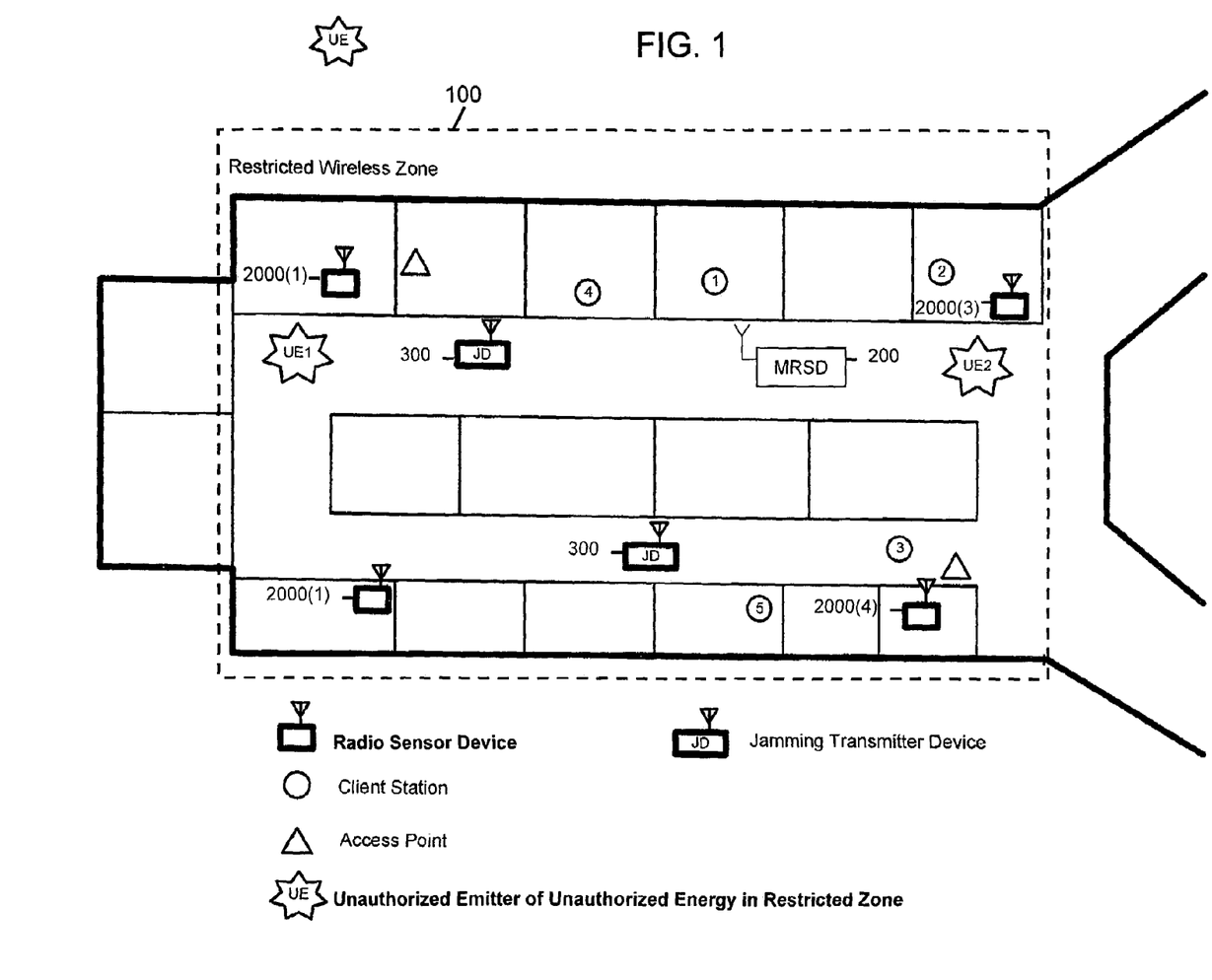
FIG. 1 is a diagram showing an example of a restricted wireless zone where it is desired to monitor for unauthorized over-the-air radio transmissions or emissions.

FIG. 1 shows as an example a map of an office building space in which several sensors 2000(1) to 2000(N) are positioned to monitor activity in the frequency band in which 802.11 WLAN activity, for example, is occurring. There is, for example, two WLAN access points (APs) and several client stations. The space circumscribed by the dotted line is designated as a restricted wireless zone 100. For example, there is activity occurring in the restricted wireless zone 100, such as 802.11 activity, that is to be protected from other RF emissions. This is very common in a hospital environment or physician's office where some medical equipment can suffer from performance or reliability degradation in the presence of RF emissions. In addition, many medical systems use wireless radio telemetry that ideally should be free from interference. Alternatively, the restricted wireless zone may be designated to have no wireless radio activity occurring in it. This is commonly referred to as a "wireless free zone", which is a special case of a restricted wireless zone. Another application of monitoring for unauthorized RF energy is in a high-security government or commercial facility. For example, certain government or corporate research locations may want to monitor for unauthorized RF energy as an indication of whether an attempt is being to breach the RF environment (or physical environment) for that installation.

The restricted wireless zone may be a region or area that consists of a single floor of a space (e.g., office building) or multiple floors. As explained below, the radio sensor devices 2000(1) to 2000(N) monitor radio frequency energy in the restricted wireless zone 100 and perform spectrum analysis on the received energy to determine whether an unauthorized over-the-air transmission or emission is occurring. In addition, or in the alternative, there is at least one mobile radio sensor device (MRSD) 200 that also monitors energy in the zone 100, and can move to various positions in the facility to monitor over-the-air energy.

Examples of sources of emitters of unauthorized over-the-air radio frequency energy (called UE's) are shown at various positions inside and outside the restricted wireless zone 100. It should be noted that although a source of unauthorized energy may be located at positions outside of the restricted wireless zone 100, it can nevertheless emit or transmit energy that is detectable inside the restricted wireless zone 100.

Also shown in FIG. 1 is a jamming transmitter device (JD) 300 that can be used to transmit energy in an attempt to disable or discontinue operation of a source of unauthorized energy. Use of the jamming transmitter device 300 is described hereinafter in conjunction with FIG. 4.

The multiple sensor-server system for monitoring a restricted wireless zone will be described first. To this end, reference is made to FIG. 2 that provides a high level diagram of the client-server-sensor system is shown. The sensors 2000(1) to 2000(N) connect to a server 3000 via a local area network, e.g., Ethernet. The client application 4000, e.g., a console application, connects to the server via the Ethernet and/or Internet.

Figure 2:
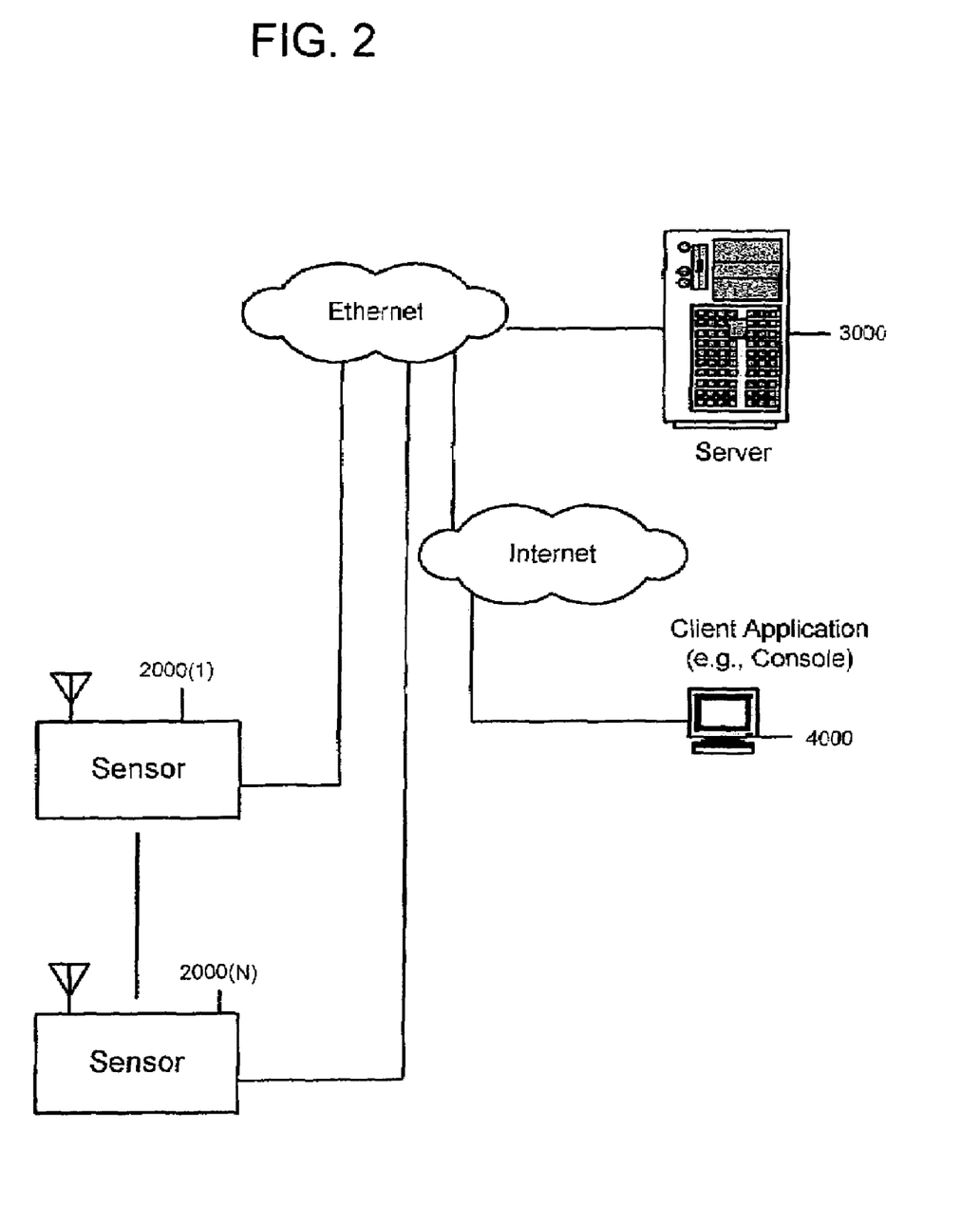
FIG. 2 is a general block diagram of a multiple sensor and server system.

The server 3000 may run on a dedicated server box, or it may be integrated with other servers such as WLAN switches, authentication servers or management servers. The server consists primarily of an application (or applications) that implements functions described hereinafter. The server 3000 interfaces with client applications 4000, such as a console graphical user interface application.

Figure 3:
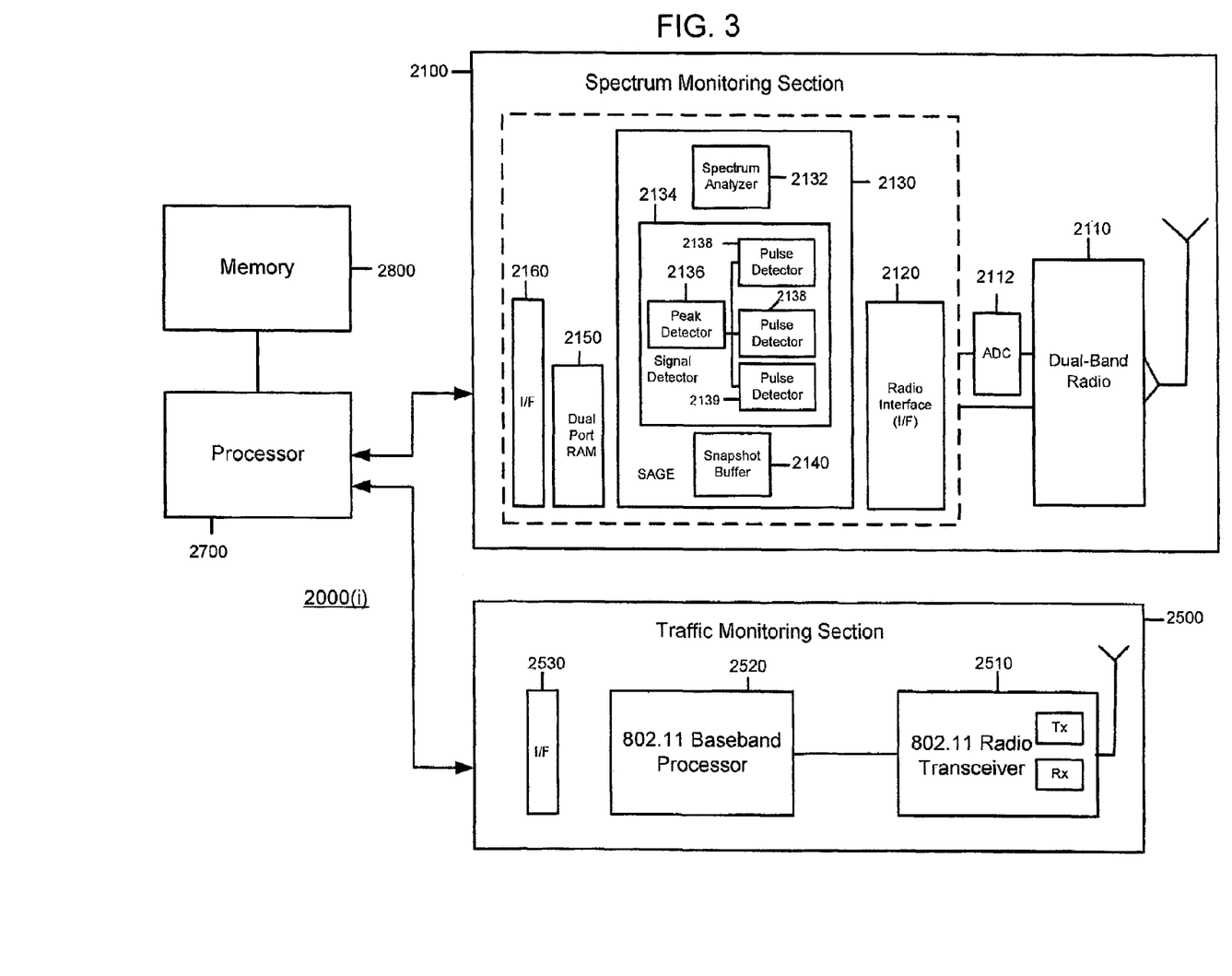
FIG. 3 is a block diagram of a radio sensor device useful in the system shown in FIG. 2.

Turning now to FIG. 3, each sensor 2000($i$) comprises a spectrum monitoring 2100 section to monitor RF activity in the frequency band and a traffic monitoring section 2500 that is capable of sending and receiving traffic according to a communication protocol, such as an IEEE 802.11 WLAN protocol. The spectrum monitoring section 2100 comprises a radio 2110 (primarily for receive operations) that is capable of tuning to receive energy at each channel (or simultaneously all channels in a wideband mode) of, for example, any of the unlicensed bands (2.4 GHz and 5 GHz) in which IEEE 802.11 WLANs operate. An analog-to-digital converter (ADC) 2112 is coupled to the radio 2100 that converts the downconverted signals from the radio 2100 to digital signals. A radio interface (I/F) 2120 is coupled directly to the radio 2100 and also to the output of the ADC 2112. A spectrum analysis engine module (SAGE) 2130 is coupled to the radio I/F 2120. The SAGE 2130 includes a spectrum analyzer 2132, a signal detector 2134 consisting of a peak detector 2136 and one or more pulse detectors 2138, and a snapshot buffer 2140. A Fast Fourier Transform (FFT) block (not shown) is coupled between the I/F 2120 and the spectrum analyzer 2132, or included in the spectrum analyzer 2132. The SAGE 2130 generates spectrum activity information that is used in the sensor and the server to determine the types of signals occurring in the frequency band, and captures signals for location measurement operations. A dual port random access memory (RAM) 2150 is coupled to receive the output of the SAGE 2130 and a processor I/F 2160 interfaces data output by the SAGE 2130 to a processor 2700, and couples configuration information from the processor 2700 to the SAGE 2130.

The functions of the SAGE 2130 will be briefly described hereinafter, but more details on the SAGE can be found in commonly assigned U.S. Patent No. 6,714,605 commonly assigned co-pending U.S. application Ser. No. 10/420,511, filed Apr. 22, 2003, entitled "System and Method for Real-Time Spectrum Analysis in a Radio Device," and commonly assigned and co-pending U.S. application Ser. No. 10/909,450, filed Aug. 2, 2004, entitled "Pulse Detection Scheme for Use in Real-Time Spectrum Analysis." The entirety of each of these patent applications and patent is incorporated herein by reference. The spectrum analyzer 2132 generates data representing a real-time spectrogram of a bandwidth of radio frequency (RF) spectrum, such as, for example, up to 100 MHz. The spectrum analyzer 2132 may be used to monitor all activity in a frequency band, for example, the 2.4–2.483 GHz ISM band, or the 5.15–5.35 GHz and 5.725–5.825 GHz UNII bands. The FFT block referred to above is, for example, a 256 frequency bin FFT block that provides (I and Q) FFT data for each of 256 frequency bins that span the bandwidth of frequency band of interest. A spectrum correction block may be included to correct for I and Q channel imbalance by estimating an I-Q channel imbalance parameter related to phase error and amplitude offset between the I and Q channels, and to suppress a side tone resulting from the RF downconversion process. The spectrum analyzer 2132 may further comprise a power computation block that computes (FFTdataI)$^2$ and (FFTdataQ)$^2$, respectively, and adds them together, to output a power value for each FFT frequency bin. The spectrum analyzer 2132 may further include a stats logic block that has logic to accumulate statistics for power, duty cycle, maximum power and a peaks histogram. Statistics are accumulated in the dual-port RAM over successive FFT time intervals. After a certain number of FFT intervals, determined by a configurable value stored in the spectrum analyzer control registers, an interrupt is generated to output the stats from the dual-port RAM. For example, the stats are maintained in the dual-port RAM 2150 for 10,000 FFT intervals before the processor reads out the values. The power versus frequency data generated by the spectrum analyzer 2132 is also used as input to the signal detector.

One type of power calculation that is useful is as follows. There are multiple FFT intervals, also called sampling intervals. During each sampling interval, a portion of a frequency band of interest is subjected to a series of FFTs. For example, for a 100 MHz wide frequency band (e.g., the 2.4 to 2.5 GHz unlicensed band), there are three sampling intervals of approximately 33 MHz. Again, each sampling interval consists of numerous FFT cycles, such as 5000 FFTs. During each FFT cycle, a measure of the energy or power present in each of a certain number of frequency bins, for example 256 bins, is obtained. According to the maximum power tracking technique, the power value at each frequency bin for a given FFT cycle is compared with the power value at that bin for the prior FFT cycle. If the power value at the bin for the new FFT cycle is greater than the power for the prior FFT cycle, then the power value for the new FFT cycle at that bin is stored. This process is performed for across all frequency bins from one FFT cycle to the next until the entire FFT interval is exhausted. Then, the power value for any particular frequency bin will be the maximum power value that occurred during the FFT interval.

The process is repeated for each frequency range (i.e., channel) of the frequency band of interest to produce data that can be plotted over time for each of the frequency ranges of the frequency band. A trace can be formed by extending the maximum power data for the previous sampling interval of a particular frequency range with data generated for the current sampling interval of that frequency range. A significant advantage of tracking maximum power in this manner is that the trace that can be plotted from this data over time will be more informative because it will inevitably change along with real-time changes in the activity. By contrast, the typical "normal" trace produced by a swept spectrum analyzer is capable of detecting and displaying only narrow portions of the RF spectrum occurring over the same time interval.

The signal detector 2134 detects signal pulses in the frequency band and outputs pulse event information entries, which include one or more of the start time, duration, power, center frequency and bandwidth of each pulse that satisfies configurable pulse characteristic criteria associated with a corresponding pulse detector.

In the signal detector 2134, the peak detector 2136 looks for spectral peaks in the (power versus frequency data derived from FFT block output), and reports the bandwidth, center frequency and power for each detected peak. The output of the peak detector 2136 is one or more peaks and related information. The pulse detectors 2138 detect and characterize signal pulses based on input from the peak detector 2136. A pulse detector 2139 may be employed to generate pulse events in a manner slightly different from pulse detectors 2138, as described in commonly assigned and co-pending U.S. patent application Ser. No. 10/909,450 entitled "Pulse Detection Scheme for Use in Real-Time Spectrum Analysis" filed on Aug. 2, 2004.

The snapshot buffer 2140 collects a set of raw digital signal samples useful for signal classification and other purposes, such as location measurements. The snapshot buffer 2140 can be triggered to begin sample collection from either the signal detector 2134 or from an external trigger source, such as a signal from the processor to capture received signal data for a period of time sufficient to include a series of signal exchanges used for location processing explained hereinafter. Alternatively, the snapshot buffer will be in a free-running state continuously storing captured data and then in response to detecting the first signal (e.g., the Probe Request frame), the snapshot buffer is put into a post-store mode that extends long enough to capture ACK frame signal data, for example.

The traffic monitoring section 2500 monitors packet activity in wireless network, e.g., a WLAN, and sends and receives certain packets that are used for location measurement processes. For example, as described hereinafter, a sensor may transmit an 802.11 Probe Request frame, data frame or request-to-send frame that may be addressed to the device to be located. Included in the traffic monitoring section 2500 are a radio transceiver 2510 (comprising a transmitter Tx and a receiver Rx) and a baseband signal processor 2520. The radio transceiver 2510 and baseband signal processor 2520 may be part of a package chipset available on the market today, such as an 802.11 WLAN chipset for any one or more of the 802.11a/b/g or other WLAN communication standards. The baseband signal processor 2520 is capable of performing the baseband modulation, demodulation and other PHY layer functions compliant with the one or more communication standards of interest (e.g., IEEE 802.11a,b,g,h, etc.). An I/F 2530 couples the baseband signal processor 2520 and radio transceiver 2510 to the processor 2700.

There may be other traffic monitoring sections in the sensor to monitor communication protocol type activity of other types, such as Bluetooth™ communications.

The processor 2700 performs the various processing algorithms described herein on the output of the SAGE 2130 and on received packets from the traffic monitoring section 2500. The processor I/F 2160 of the spectrum monitoring section 2100 and the processor I/F 2530 of traffic monitoring section 2500 may be a Mini-PCI or PC-Card (e.g., Cardbus™) interface, or any other interface known in the art. While not shown in FIG. 2, there is also an LAN interface block (e.g., Ethernet) that is coupled to the processor 2700 to enable the sensor to communicate with the server with a wired LAN connection. The processor 2700 may generate signals to control the radio 2110 independently of the radio transceiver 2510, such that spectrum monitoring is occurring on one channel while protocol monitoring is simultaneously occurring on another channel, for example.

A WLAN AP may include all of the functionality of a sensor described above, and may be switched between AP operating mode and a sensor operating mode.

The server 3000 manages all of the sensors it communicates with. It aggregates data from the sensors, performs analysis on the data and presents the data in formats amenable to other network management entities, such as to a consoles user interface application. For example, the server 3000 may correlate information pertaining to unauthorized radio frequency energy detected by one or more sensors 2000 at their corresponding positions in the region of interest.

Figure 4:
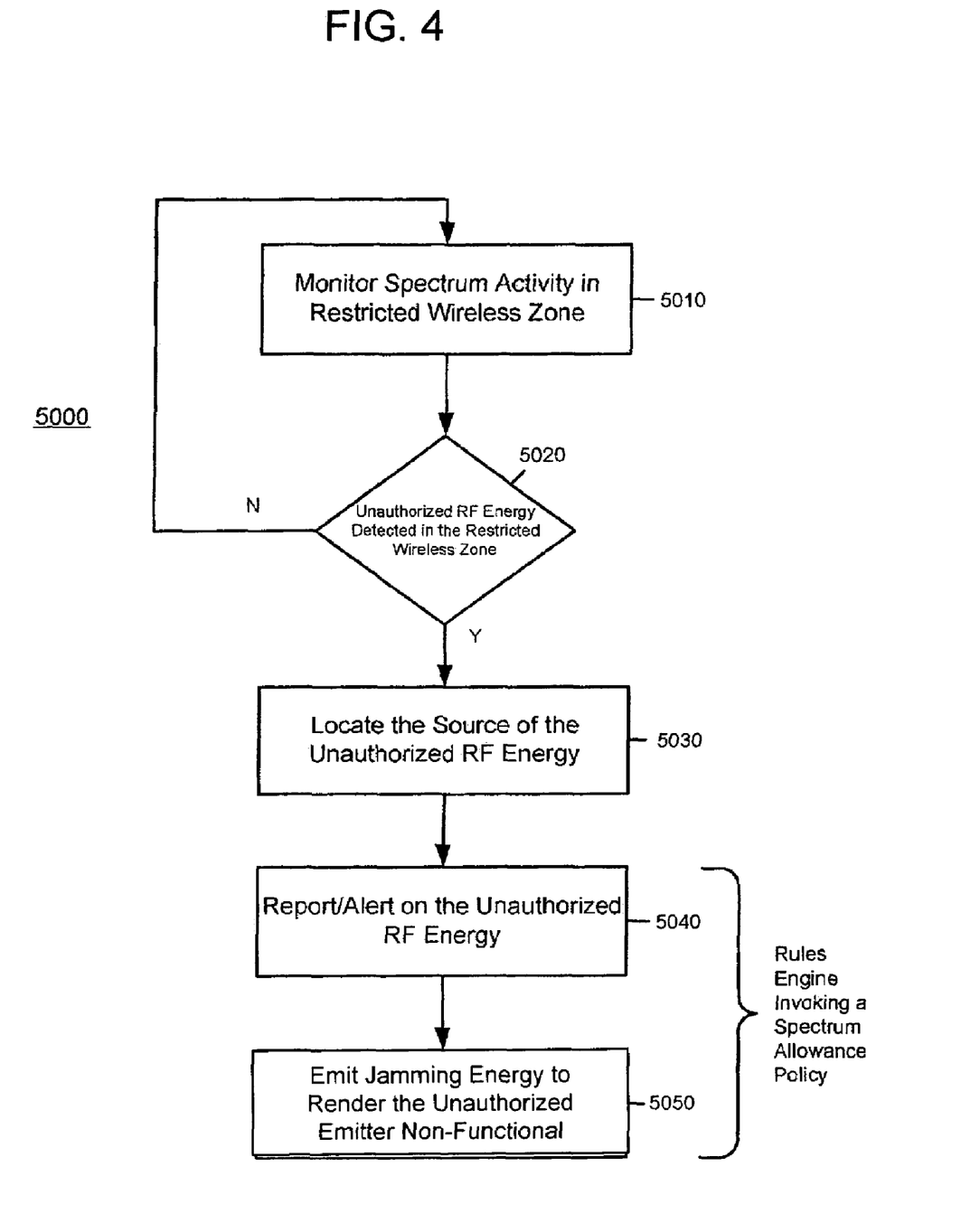
FIG. 4 is a flow chart showing the steps of a process to monitor for unauthorized radio frequency energy in a restricted wireless zone.
Figure 5:
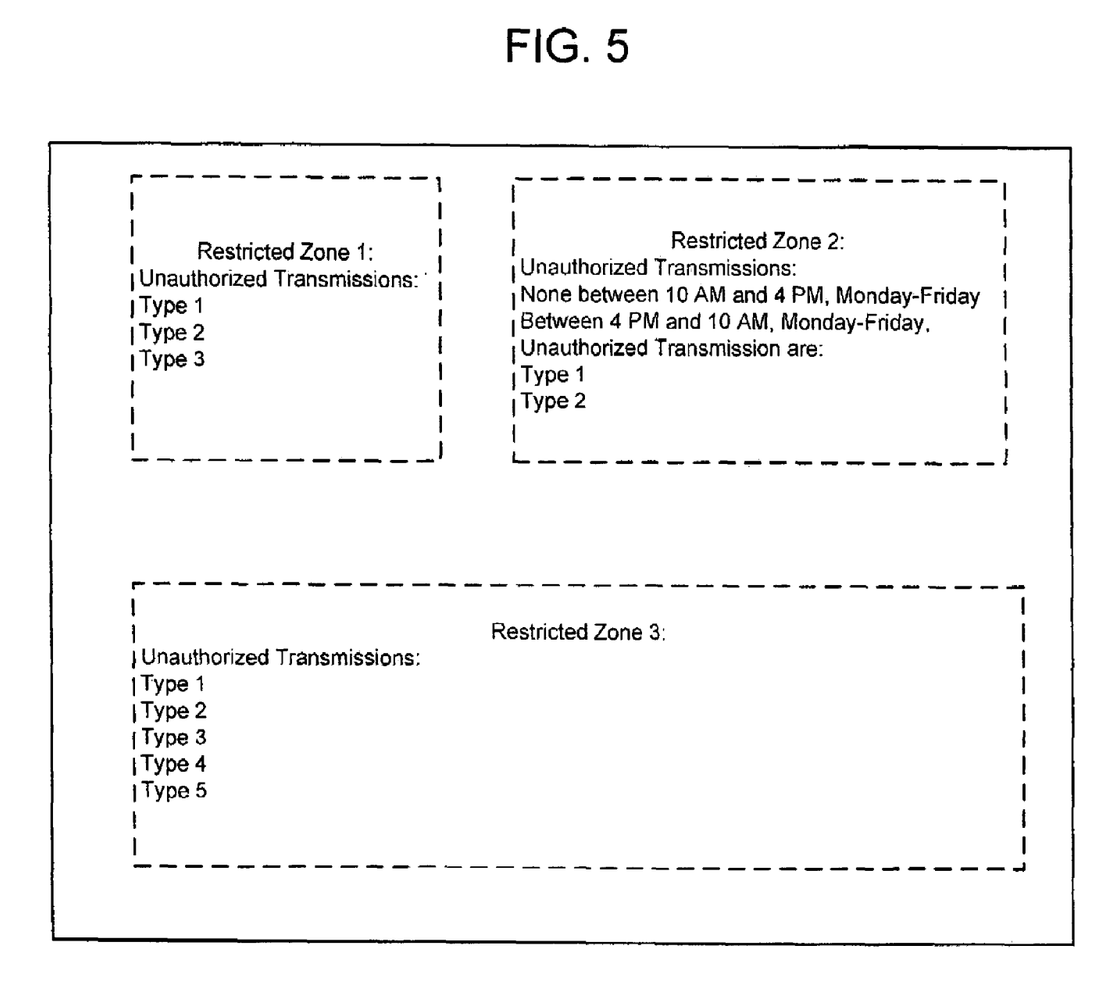
FIG. 5 is a diagram showing how each of several restricted wireless zones may have unique parameters to monitor for unauthorized RF energy.

FIGS. 4 and 5 illustrate further details of a process 5000 of monitoring a restricted wireless zone. In step 5010, over-the-air radio frequency activity is monitored in the zone by one or more sensors. The sensors perform spectrum analysis on the receive radio frequency energy and produce data representative thereof. If the sensors are coupled to a server, then the sensors forward the data they produce to the server. Alternatively, if the sensor is a mobile sensor device, then it simply continues to analyze the received energy and accumulate data. The data may include spectrum analyzer type data, pulse event data, signal classification events, pulse histograms and power data as described in the foregoing.

In step 5020, the data is analyzed or examined to determine whether there is any unauthorized RF energy detected by the sensors in energy received by the sensor in the restricted wireless zone. An example of unauthorized RF energy may include any RF energy that is determined to not be associated with the protected network activity in the wireless zone, e.g., any non-WLAN activity or other non-medical telemetry activity. Other examples of unauthorized activity may include any energy that cannot be classified (by type) by a sensor. Either the analysis of the spectrum data or outputs of the signal classification process may be compared against stored data or rules describing types or characteristics of RF energy that are deemed to be unauthorized for a particular zone in which it is received. The analysis may be to detect certain distinctive characteristics of certain types of unwanted/unauthorized RF energy. For example, this may involve looking for energy of a bandwidth greater than a certain bandwidth threshold, power threshold and duration threshold, pulses of RF energy of a certain bandwidth/center frequency/duration that occur on a regular basis, etc. To expand and generalize, at least one characteristic of the received RF energy is examined to determine whether an unauthorized emission is occurring may include one or more of: power versus frequency data, signal pulse data including pulse center frequency, pulse bandwidth, pulse duration and time between pulses of radio frequency energy, and histograms of signal pulse data associated with signal pulses detected over time. Additional characteristics useful for classification and for authorized RF energy analysis may include synchronization word detection, modulation type, ramp-up profile, etc., as well as for a portion of the frequency band (e.g., a channel), one or more of: average power, duty cycle, pulses per second and average pulse duration.

Further still, the unauthorized radio frequency energy determination may be achieved by classifying one or more signals occurring based on data derived from the received radio frequency energy. For example, data pertaining to signals classified from the received radio frequency energy is compared with data for signals deemed to be authorized in the zone and/or data for energy deemed to be unauthorized in the zone, and declaring that unauthorized radio frequency energy is occurring in the zone when it does not match data for signals that are authorized in the zone or matches data for signals that are authorized in the zone.

Steps 5010 and 5020 are performed continuously and when unauthorized RF energy is detected, the process continues to step 5030. In the case of the sensor-server system, the sensors may also forward raw analyzed data to the server to enable the server to make a determination whether a sensor is receiving unauthorized energy in the restricted zone.

In step 5030, the location or position of the source of the unauthorized RF energy may be determined using one of a variety of positioning techniques. The step is optional, but in any event, it provides a more detailed estimation of the position of the source of the unauthorized emission within or outside the restricted wireless zone, whereas step 5020 determines whether an emission from an unauthorized emitter is detected within the restricted wireless zone. The sensors may be located at known positions so their detection of unauthorized RF energy in a predetermined restricted zone can be ascertained in that manner. Examples of techniques for estimating the position of the sources of the unauthorized energy are disclosed in commonly assigned and co-pending U.S. application Ser. No. 10/976,509, filed Oct. 29, 2004, entitled "System and Method for Locating Radio Emitters Using Self-Calibrated Path Loss Computation". The techniques described in these patent applications can be used in a multiple sensor/server system implementation or with a single mobile sensor device to estimate the position of a source of an unauthorized emission based on data derived from receiving the radio frequency energy at one or more known positions. When suitably sensor-equipped client stations are monitoring the spectrum activity, then their positions are not always fixed. Therefore, their locations may be tracked by the location capability described above (with respect to known positions of other sensors), in order to correlate the position of the client station with detection of the unauthorized RF energy. In some cases, it may not be possible to determine the position of the unwanted emitter, and in other cases, it may not be desirable. In addition, if the unauthorized energy source is moving, it may be further desirable to track its position as it moves over, time, within and out of a restricted wireless zone.

In step 5040, an alert or report concerning the unauthorized energy and statistics describing it may be generated and sent to a console application or other application. The alert may comprise one or more of: an email message to one or more email addresses of an IT administrator, visual display alert on a video monitor, audio announcement and a simple network management protocol (SNMP) trap. Upon receiving this alert and associated report, an IT administrator may take actions such as sending a technician to the location of the source and disabling it, or asking the operator of that unauthorized device to turn it off.

In step 5050, a jamming signal may be transmitted by one of the sensors or by a dedicated jamming transmitter device 300, shown in FIG. 2 that is coupled by a wired or wireless link to a sensor, or to a wired network to which the server is connected. The jamming transmitter device (JD) transmits a signal at the appropriate center frequency and having a bandwidth and power to sufficiently interfere with the unauthorized signal or signals so that the device(s) transmitting the unauthorized signal(s) will cease when the device, or an operator of such device will realize its transmissions are being jammed. Another possibility is that the source device of the unauthorized RF energy does not cease to transmit, but reception at another device of the unauthorized RF energy is effectively disabled by the presence of the jamming signal. For example, a wireless video camera it the offending unauthorized transmitter that keeps on transmitting even after the jamming transmission, but at least reception of the wireless video signal will be made impossible by the jamming signal.

Depending on the location of the source of the unauthorized transmission or emission, the closest one of several jamming transmitter devices may be selected to transmit the jamming signal. The closest jamming transmitter may be determined by comparing the known positions of each of the jamming transmitters with the estimated position of the unauthorized energy source.

Furthermore, a mobile sensor device (or the server in the case of a multiple sensor-server system) may store data pertaining to said spectral characteristics during a time interval when unauthorized radio frequency energy is determined to exist. The data obtained from said time interval when unauthorized radio frequency energy is determined to exist can retrieved at a later time and played back. For example, spectrum plots for one or more of power versus frequency, power versus time, duty cycle, maximum power, etc., can be stored and later played backed (displayed) to allow a user to view those plots as if the unauthorized energy were occurring in real-time.

Figure 6:
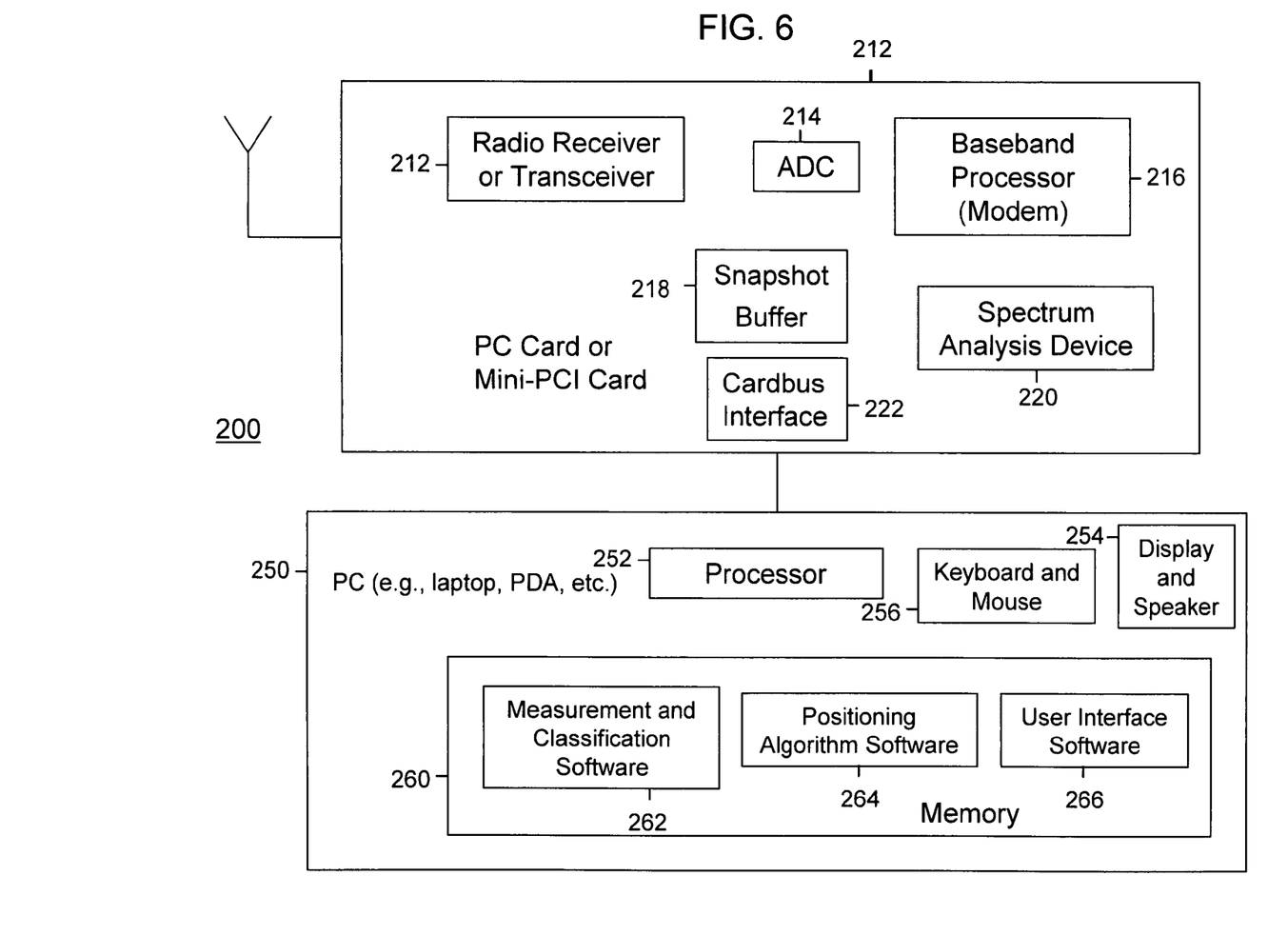
FIG. 6 is a block diagram of a mobile radio sensor device also useful for monitoring for unauthorized over-the-air radio transmissions or emissions.

FIG. 6 shows that there may be several different restricted wireless zones. In this example, there are multiple restricted wireless zones within a particular building, each with different restrictions. For example, in restricted zone 1, signal types 1–3 are unauthorized. Signal types 1–3 may be Bluetooth™ devices, cordless phones and other devices that are known to interfere with 802.11 WLANs. In restricted zone 2, there are no restrictions during the hours of 10 AM to 4 PM, Monday through Friday, but during the hours of 4 PM to 10 AM, signal types 1 and 2 are deemed unauthorized. For example, signal types 1 and 2 are cellular phones. In restricted zone 3, there is a more exhaustive set of unauthorized transmissions. This location-dependent restricted zone configuration may be useful in a medical facility. Restricted zone 1 may be a business office section where it is desired to protect 802.11 WLAN necessary for operations of that facility. Restricted zone 2 may be a waiting area in which use of wireless devices is permitted except after 4 PM. Restricted zone 3 may be a medical treatment (emergency, operating, etc.) area where most wireless radio activity is prohibited. There are numerous signal types designated as unauthorized for zone 3, in order to protect the operation of sensitive medical or surgical equipment. If any of the designated types of signals are determined to occur in zone 3, it may be desirable for the system to immediately locate the source of those transmissions so that they can be disabled.

The physical dimensions and positions of the zones may be defined by a user through suitable user interface software that allows a user to draw the zone over a map of a region, for example. In doing so, the user will define the physical dimensions and position of the zone to the software. In addition, the user can define parameters associated with radio frequency energy that is to be considered unauthorized and/or authorized for the zone. This may involve entering names of certain signal types that are deemed to be authorized or unauthorized for the zone, or entering parameters of spectral characteristics (bandwidth, power, pulse duration, center frequency, frequency hopping nature, etc.) pertaining to radio frequency energy that is deemed to be unauthorized in the zone due to its impact on other "protected" activity in the zone, or for other reasons.

A further application of this monitoring technique is to use a rules-based engine or algorithm that decides how to respond to a particular type of unauthorized RF energy detected in a particular restricted wireless zone. The software to execute the rules-based algorithm may reside in a mobile sensor device, or in the case of the sensor-server system, in a sensor or the server. The rules-based algorithm responds to inputs related to one or more of: the detection of unauthorized RF energy, the type of unauthorized RF energy if the type can be determined and if not other data descriptive of it, where the detection occurred (in which particular restricted wireless zone, if any), and the time that the detection is occurring. The algorithm may execute a "spectrum allowance policy" which determines the type of action to take, if any, in response to one or more of these inputs. For example, if the type of unauthorized emitter is a cordless phone in restricted wireless zone 1, then the rules engine may have a policy to take an action that may involve alerting an IT administrator (via email, short-messaging, one-way pager, etc.) that a cordless phone has been detected in zone 1. On the other hand, if a Bluetooth™ device is detected, this may not be considered an unauthorized emitter, and no action occurs. By contrast, if a continuous emitter, such as a wireless video camera is detected, this may be defined as a type of unauthorized emitter for zone 1, an alert is generated, and an attempt is made to locate the device based on reception of its signals at the plurality of sensors. In addition, a jamming signal may be triggered for emission in an attempt to disable the continuous emitter.

Turning to FIG. 6, an exemplary block diagram of a mobile radio sensor device 200 will be described. There is an RF processing section 210 and a data processing section 250. These sections may be integrated as part of a computing device, such as a laptop computer, PDA or other hand-held device, or the RF processing section 210 may be embodied as a PC or mini-PCI card and the data processing section 250 is a computer device that interfaces (via a Cardbus™ interface 222) to the RF processing section 210. The RF processing section 210 comprises a radio receiver (or transceiver) 212, analog to digital converter (ADC) 214, baseband processor (e.g., modem) 216, a snapshot buffer 218 for storing digital samples of received downconverted RF energy (not demodulated) and a spectrum analysis device 220. The snapshot buffer 218 stores raw digital samples of RF energy for a time interval. An example of a spectrum analysis device is the SAGE module disclosed in commonly assigned U.S. Pat. No. 6,714,605 B2 and in the following commonly assigned and co-pending U.S. applications (which are incorporated herein by reference):

| Title | Filing Date | application Ser. No. |
|---|---|---|
| System and Method for Real-Time Spectrum Analysis in a Radio Device | Apr. 22, 2003 | 10/420,511 |
| Pulse Detection Scheme for Use in Real-Time Spectrum Analysis | Aug. 2, 2004 | 10/909,450 |

Techniques for classifying signals are described in commonly assigned U.S. Pat. No. 6,850,735 B2 and in the following commonly assigned and co-pending U.S. applications (which are incorporated herein by reference):

| Title | Filing Date | application Ser. No. |
|---|---|---|
| System and Method for Classifying Signals Occurring in a Frequency Band | Apr. 22, 2003 | 10/420,362 |
| System and Method for Classifying Signals Using Timing Templates, Power Templates and Other Techniques | Jul. 28, 2003 | 10/628,603 |
| Signal Classification Methods for Scanning Receiver and Other Applications | Apr. 22, 2004 | 10/830,414 |
| Improved System Architecture for Real-Time Spectrum Analysis, Signal Classification and Protocol Analysis | Feb. 8, 2005 | 60/651,141 |

The data processing section 250 comprises a processor 252 (e.g., a Pentium™ class processor), a display and speaker module 254 for displaying data and presenting audio alerts to a user, a keyboard and mouse 256 and memory 260 that stores RF measurement and classification software 262 which includes software detect unauthorized emissions described herein based on data produced by the spectrum analysis device and/or raw digital data stored in the snapshot buffer, positioning algorithm software 264 to perform a positioning algorithm on data associated with received energy and user interface software 266 for presenting data to a user.

In sum, a method is provided for monitoring for unauthorized radio frequency energy, comprising receiving radio frequency energy in a region that encompasses a zone in which it is desired to monitor for unauthorized radio frequency energy; and analyzing at least one characteristic of the received radio frequency energy to determine whether unauthorized radio frequency energy is occurring in the zone.

In addition, a system is provided for monitoring for unauthorized radio frequency energy, comprising: a plurality of radio sensor devices each at a corresponding position in a region that encompasses a zone in which it is desired to monitor for unauthorized radio frequency energy, wherein each radio sensor device receives radio frequency energy and analyzes at least one characteristic of the radio frequency energy it receives to determine whether unauthorized radio frequency energy is occurring; and a computer connected to each of the plurality of radio sensor devices that receives data from the radio sensor devices concerning radio frequency energy that they monitor, and wherein the central computer correlates the data received from the radio sensor devices with respect to unauthorized radio frequency energy determined to be occurring in the zone.

Moreover, a radio device is provided comprising: a radio receiver that receives radio frequency energy; and a processor coupled to the radio receiver that analyzes at least one characteristic of the received radio frequency energy to determine whether unauthorized radio frequency energy is occurring in the zone.

Further still, a processor readable medium is provided which stores instructions that, when executed by a processor, cause the processor to analyze at least one characteristic associated with received radio frequency energy to determine whether unauthorized radio frequency energy is occurring in a zone where said radio frequency energy is received.

The above description is intended by way of example only.

What is claimed is:

1. A method for monitoring for unauthorized radio frequency energy, comprising:
   a. receiving radio frequency energy in a region that encompasses at least a zone in which it is desired to monitor for unauthorized radio frequency energy;
   b. analyzing spectral characteristics of the received radio frequency energy to determine whether unauthorized radio frequency energy is occurring in the zone, wherein analyzing comprises classifying one or more signals occurring based on said spectral characteristics derived from the received radio frequency energy and comparing spectral data pertaining to signals classified from the received radio frequency energy with spectral data for signals deemed to be authorized in the zone and/or data for signals to be unauthorized in the zone; and
   c. declaring that unauthorized radio frequency energy is occurring in the zone when it does not match spectral data for signals that are authorized in the zone or matches spectral data for signals that are unauthorized in the zone.

2. The method of claim 1, and further comprising storing data pertaining to said spectral characteristics during a time interval when unauthorized radio frequency energy is determined to be occurring; and at a later time, retrieving and displaying the spectral characteristics from said time interval when unauthorized radio frequency energy is determined to be occurring.

3. The method of claim 1, wherein analyzing further comprises analyzing one or more of: power versus frequency data, signal pulse data including pulse center frequency, pulse bandwidth, pulse duration and time between pulses of radio frequency energy, and histograms of signal pulse data associated with signal pulses detected over time.

4. The method of claim 1, wherein analyzing further comprises analyzing for a portion of the frequency band one or more of: average power, duty cycle, pulses per second and average pulse duration.

5. The method of claim 1, wherein analyzing further comprises during a time interval, computing a series of a plurality of Fast Fourier Transforms (FFTs) of the received radio frequency energy during each of a plurality of time intervals, wherein the series of FETs during a time interval span the same frequency sub-band, but the frequency sub-band is different across the time intervals, and wherein the plurality of frequency sub-bands are substantially contiguous and span a frequency band of interest; accumulating data associated with each of the series of FFTs during ea the plurality of time intervals; and for each time interval, storing a value representing the maximum power that has occurred in each frequency bin over all FFTs taken during that time interval.

6. The method of claim 1, and further comprising determining a location of the source of the unauthorized radio frequency energy based on data derived from receiving the radio frequency energy at one or more known positions.

7. The method of claim 6, and further comprising tracking a source of unauthorized radio frequency energy as it moves over time.

8. The method of claim 1, and further comprising defining physical dimensions and position for the zone, and parameters associated with radio frequency energy that is to be considered unauthorized and/or authorized in the zone.

9. The method of claim 1, and further comprising invoking an action in response to determining that unauthorized radio frequency energy is occurring in the zone.

10. The method of claim 9, wherein invoking an action comprises determining the type of action to take in response to detection of unauthorized radio frequency energy based on at least one spectral related characteristic of the unauthorized radio frequency energy determined to be occurring in the zone.

11. The method of claim 1, and further comprising defining a plurality of zones in which it is desired to monitor for unauthorized radio frequency energy, and invoking an action in response to detection of unauthorized radio frequency energy in one of the plurality of zones, wherein said action is based on which a particular one of the plurality of zones in which the unauthorized radio frequency energy is determined to be occurring.

12. The method of claim 11, and further comprising selecting one or more of a plurality of available actions depending on which particular one of the plurality of zones the unauthorized radio frequency energy is detected.

13. The method of claim 12, wherein selecting comprises selecting one or more of the plurality of available actions based further on at least one spectral related characteristic of the unauthorized radio frequency energy that is determined to be occurring.

14. The method of claim 1, and further comprising generating an alert when an unauthorized device is detected, said alert comprising one or more of: an email message, visual display, audio announcement and SNMP trap.

15. The method of claim 1, wherein receiving comprises receiving radio frequency energy at a plurality of positions in said region, and analyzing comprises analyzing at least one spectral related characteristic of the received radio frequency energy at each of the plurality of positions to determine whether there is unauthorized radio frequency energy occurring, and further comprising correlating information pertaining to unauthorized radio frequency energy received at each of the plurality of positions.

16. A method for monitoring for unauthorized radio frequency energy, comprising:
   a. receiving radio frequency energy in a region that encompasses at least a zone in which it is desired to monitor for unauthorized radio frequency energy;
   b. analyzing spectral characteristics of the received radio frequency energy to determine whether unauthorized radio frequency energy is occurring in the zone;
   c. comparing spectral data pertaining to signals classified from the received radio frequency energy with spectral data for signals deemed to be authorized in the zone and/or data for signals to be unauthorized in the zone; and
   d. declaring that unauthorized radio frequency energy is occurring in the zone when it does not match spectral data for signals that are authorized in the zone or matches spectral data for signals that are unauthorized in the zone.

17. The method of claim 1, and further comprising transmitting a jamming signal having characteristics to cause interference with the unauthorized radio frequency energy.

18. The method of claim 17, wherein transmitting comprises transmitting a jamming signal from at least one device that is determined to be close to the source of the unauthorized radio frequency energy.

19. The method of claim 1, wherein receiving comprises receiving radio frequency energy in a region that encompasses at least two or more zones, and wherein analyzing comprises analyzing spectral characteristics of the received radio frequency energy in each of the two or more zones, wherein each zone may have associated therewith different spectral related parameters of radio frequency energy that is to be considered unauthorized radio frequency energy.

20. The method of claim 19, and further comprising defining physical dimensions and position for the two or more zones, and parameters associated with radio frequency energy that is to be considered unauthorized and/or authorized in each of the respective two or more zones.

21. A system for monitoring for unauthorized radio frequency energy, comprising:
   a. a plurality of radio sensor devices each at a corresponding position in a region that encompasses a zone in which it is desired to monitor for unauthorized radio frequency energy, wherein each radio sensor device receives radio frequency energy and analyzes spectral characteristics of the radio frequency energy it receives to determine whether unauthorized radio frequency energy is occurring; and
   b. a computer connected to each of the plurality of radio sensor devices that receives data from the radio sensor devices concerning radio frequency energy that they monitor, and wherein the computer correlates the data received from the radio sensor devices with respect to data for unauthorized radio frequency energy determined to be occurring in the zone.

22. The system of claim 21, wherein the computer stores data received from at least one radio sensor device pertaining to spectral characteristics associated with received radio frequency energy by at least one radio sensor device during a time interval when unauthorized radio frequency energy is determined to be occurring, and at a later time, retrieves and displays the spectral characteristics from said time interval when unauthorized radio frequency energy is determined to be occurring.

23. A radio device comprising:
   a. a radio receiver that receives radio frequency energy;
   b. a processor coupled to the radio receiver the characteristic of the received radio frequency energy to determine whether unauthorized radio frequency energy is occurring in the zone; and
   c. a spectrum analysis device coupled to the radio receiver and to the processor, wherein the spectrum analysis device produces data pertaining to spectral characteristics of the received radio frequency energy, and wherein the processor analyzes said spectral characteristics to determine whether unauthorized radio frequency energy is occurring in the zone.

24. The radio device of claim 23, wherein the processor analyzes for a portion of the frequency band one or more of: average power, duty cycle, pulses per second and average pulse duration.

25. The radio device of claim 23, wherein the spectrum analysis device computes a series of a plurality of Fast Fourier Transforms (FFTs) of the received radio frequency energy during each of a plurality of time intervals, wherein the series of FFTs during a time interval span the same frequency sub-band, but the frequency sub-band is different across the time intervals, and wherein the plurality of frequency sub-bands are substantially contiguous and span a frequency band of interest; accumulating data associated with each of the series of FFTs during each of the plurality of time intervals; and for each time interval, the processor stores a value representing the maximum power that has occurred in each frequency bin over all FFTs taken during that time interval.

26. The radio device of claim 23, wherein the processor classifies one or more signals occurring based on data derived from the received radio frequency energy.

27. The radio device of claim 26, wherein the processor compares data pertaining to signals classified from the received radio frequency energy with data for signals deemed to be authorized in the zone and/or data for signals to be unauthorized in the zone, and declares that unauthorized radio frequency energy is occurring in the zone when it does not match data for signals that are authorized in the zone or matches data for signals that are unauthorized in the zone.

28. The radio device of claim 23, wherein the processor compares data pertaining to one or more characteristics of the received radio frequency energy with data for authorized radio frequency energy in the zone, and declares that unauthorized radio frequency energy is occurring in the zone when it does not match data for authorized radio frequency energy in the zone.

29. The radio device of claim 23, wherein the processor processes data output by the spectrum analysis device associated with received radio frequency energy in each of two or more zones and processes the data such that each zone has different parameters of radio frequency energy that is to be considered unauthorized radio frequency energy.

30. The radio device of claim 29, wherein the processor is responsive to user interface commands to define physical dimensions and position for the two or more zones, and parameters associated with radio frequency energy that is to be considered unauthorized and/or authorized in each of the respective two or more zones.

31. The radio device of claim 23, wherein the processor is responsive to user interface commands to define physical dimensions and position for the zone, and parameters associated with radio frequency energy that is to be considered unauthorized and/or authorized in the zone.

32. The radio device of claim 23, wherein the processor is responsive to user interface commands for defining a plurality of zones in which it is desired to monitor for unauthorized radio frequency energy, and invokes an action in response to detection of unauthorized radio frequency energy in one of the plurality of zones, wherein said action is based on which a particular one of the plurality of zones in which the unauthorized radio frequency energy is determined to be occurring.

33. The radio device of claim 23, wherein the processor selects one or more of a plurality of available actions based on at least one of: which particular one of the plurality of zones the unauthorized radio frequency energy is detected and at least one characteristic of the unauthorized radio frequency energy that is determined to be occurring.

34. The radio device of claim 23, and further comprising a memory that stores for later retrieval and display data pertaining to said spectral characteristics during a time interval when unauthorized radio frequency energy is determined to be occurring.

35. A processor readable medium storing instructions that, when executed by a processor, cause the processor to: analyze at least one characteristic associated with received radio frequency energy to determine whether unauthorized radio frequency energy is occurring in a zone where said radio frequency energy is received, and to store data pertaining to characteristics associated with radio frequency energy received during a time interval when unauthorized radio frequency energy is determined to be occurring, and at a later time, effect retrieval and display of the spectral characteristics from said time interval when unauthorized radio frequency energy is determined to be occurring.

36. The processor readable medium of claim 35, wherein the instructions to analyze comprise instructions to analyze one or more of: power versus frequency data, signal pulse data including pulse center frequency, pulse bandwidth, pulse duration and time between pulses of radio frequency energy, and histograms of signal pulse data associated with signal pulses detected over time.

37. The processor readable medium of claim 35, wherein the instructions to analyze comprise instructions for analyzing one or more of: average power, duty cycle, pulses per second and average pulse duration.

38. The processor readable medium of claim 35, wherein the instructions to analyze comprise instructions for classifying one or more signals occurring based on data derived from the received radio frequency energy.

39. The processor readable medium of claim 38, and further comprising instructions stored on the medium for comparing data pertaining to signals classified from the received radio frequency energy with data for signals deemed to be authorized in the zone and/or data for signals to be unauthorized in the zone, and declaring that unauthorized radio frequency energy is occurring in the zone when it does not match data for signals that are authorized in the zone or matches data for signals that are unauthorized in the zone.

40. The processor readable medium of claim 35, and further comprising instructions stored on the medium for comparing data pertaining to one or more characteristics of the received radio frequency energy with data for authorized radio frequency energy in the zone, and declaring that unauthorized radio frequency energy is occurring in the zone when it does not match data for authorized radio frequency energy in the zone.

41. The processor readable medium of claim 35, wherein the instructions to analyze comprise instructions for analyzing characteristics associated with received radio frequency energy in each of the two or more zones, wherein each zone may have associated therewith different parameters of radio frequency energy that is to be considered unauthorized radio frequency energy.

42. A method for monitoring for unauthorized radio frequency energy, comprising:
   a. receiving radio frequency energy in a region that encompasses at least two or more zones in which it is desired to monitor for unauthorized radio frequency energy; and
   b. analyzing spectral characteristics of the received radio frequency energy in each of the two or more zones to determine whether unauthorized radio frequency energy is occurring in the zone, wherein each zone may have associated therewith different spectral related parameters of radio frequency energy that is to be considered unauthorized radio frequency energy.

43. The method of claim 42, and further comprising defining physical dimensions and position for the two or more zones, and parameters associated with radio frequency energy that is to be considered unauthorized and/or authorized in each of the respective two or more zones.

44. A method for monitoring for unauthorized radio frequency energy, comprising:
   a. receiving radio frequency energy at a plurality of positions in a region that encompasses at least one zone in which it is desired to monitor for unauthorized radio frequency energy;
   b. analyzing at least one spectral related characteristic of the received radio frequency energy at each of the plurality of positions to determine whether there is unauthorized radio frequency energy occurring; and
   c. correlating information pertaining to unauthorized radio frequency energy received at each of the plurality of positions.

45. A method for monitoring for unauthorized radio frequency energy, comprising:
   a. receiving radio frequency energy in a region that encompasses at least a zone in which it is desired to monitor for unauthorized radio frequency energy;
   b. analyzing spectral characteristics of the received radio frequency energy to determine whether unauthorized radio frequency energy is occurring in the zone; and
   c. storing data pertaining to said spectral characteristics during a time interval when unauthorized radio frequency energy is determined to be occurring; and
   d. at a later time, retrieving and displaying the spectral characteristics from said time interval when unauthorized radio frequency energy is determined to be occurring.

46. A method for monitoring for unauthorized radio frequency energy, comprising:

a. receiving radio frequency energy in a region that encompasses at least a zone in which it is desired to monitor for unauthorized radio frequency energy; and
b. analyzing spectral characteristics of the received radio frequency energy to determine whether unauthorized radio frequency energy is occurring in the zone, wherein analyzing comprises:
   i. during a time interval, computing a series of a plurality of Fast Fourier Transforms (FFTs) of the received radio frequency energy during each of a plurality of time intervals, wherein the series of FFTs during a time interval span the same frequency sub-band, but the frequency sub-band is different across the time intervals, and wherein the plurality of frequency sub-bands are substantially contiguous and span a frequency band of interest;
   ii. accumulating data associated with each of the series of FFTs during each of the plurality of time intervals; and
   iii. for each time interval, storing a value representing the maximum power that has occurred in each frequency bin over all FFTs taken during that time interval.

* * * * *